US012448304B2

(12) United States Patent
Cantrell

(10) Patent No.: US 12,448,304 B2
(45) Date of Patent: Oct. 21, 2025

(54) THERMAL DRIVEN WATER DESALINATION SYSTEM USING FORWARD OSMOSIS

(71) Applicant: Bob I. Cantrell, Salem, OR (US)

(72) Inventor: Bob I. Cantrell, Salem, OR (US)

(*) Notice: Subject to any disclaimer, the term of this patent is extended or adjusted under 35 U.S.C. 154(b) by 0 days.

(21) Appl. No.: 18/816,355

(22) Filed: Aug. 27, 2024

(65) Prior Publication Data

US 2025/0074796 A1 Mar. 6, 2025

Related U.S. Application Data

(60) Provisional application No. 63/622,793, filed on Jan. 19, 2024, provisional application No. 63/534,863, filed on Aug. 28, 2023.

(51) Int. Cl.
C02F 1/44 (2023.01)
C02F 101/10 (2006.01)
C02F 103/08 (2006.01)

(52) U.S. Cl.
CPC .......... *C02F 1/445* (2013.01); *C02F 2101/10* (2013.01); *C02F 2103/08* (2013.01); *C02F 2301/063* (2013.01)

(58) Field of Classification Search
None
See application file for complete search history.

(56) References Cited

U.S. PATENT DOCUMENTS 7,955,506 B2 6/2011 Bryan et al.
8,021,549 B2 9/2011 Kirts
(Continued)

FOREIGN PATENT DOCUMENTS

JP H0852461 A * 2/1996
JP 2016506299 A 3/2016
KR 20150083067 A 7/2015

OTHER PUBLICATIONS

Tae-woo Kim, Sunwon Park, Kevin Yeh, Cost-effective design of a draw solution recovery process for forward osmosis desalination, Desalination, vol. 327, 2013, pp. 46-51 A1 (Year: 2013).*

(Continued)

*Primary Examiner* — Magali P Slawski
*Assistant Examiner* — Eric J Mccullough
(74) *Attorney, Agent, or Firm* — Bold IP, PLLC; Houda El-Jarrah

(57) ABSTRACT

A system and method for water desalination using forward osmosis to address problems associated with scarcity of freshwater around the world. The system uses ammonium bicarbonate as the draw solution to draw out freshwater through a forward osmosis (FO) membrane from an amount of saltwater or other contaminated water initially directed through one side of the FO membrane. The ammonium bicarbonate draws the desalinated water through the membrane of the FO membrane. Brine or other solutes are directed away. The combination of desalinated water and ammonium bicarbonate is directed through a series of valves and pumps, including a heat pump, and through a hydrophobic membrane that allows freshwater (product water) to be obtained from the desalination process in a more cost-effective and efficient manner. The ammonium bicarbonate is recycled and reused to generate additional draw solution for additional batches of saltwater or contaminated water for desalination.

13 Claims, 7 Drawing Sheets

(56) References Cited

U.S. PATENT DOCUMENTS

| | | |
|---|---|---|
| 8,029,671 B2 | 10/2011 | Cath et al. |
| 9,044,711 B2 | 6/2015 | McGinnis |
| 9,656,883 B2 | 5/2017 | Heinzl |
| 9,822,021 B2 | 11/2017 | McGinnis et al. |
| 10,532,319 B2 | 1/2020 | Hu et al. |
| 11,318,418 B2 | 5/2022 | Kraytsberg et al. |
| 2013/0220927 A1* | 8/2013 | Moody ............... C02F 1/445 210/652 |
| 2014/0319056 A1 | 10/2014 | Fuchigami et al. |
| 2015/0136676 A1* | 5/2015 | Helm ............. B01D 61/0022 210/232 |
| 2016/0002073 A1 | 1/2016 | Nowosielski-Slepowron |
| 2016/0051932 A1 | 2/2016 | Kang et al. |
| 2018/0273402 A1 | 9/2018 | Helsen |
| 2021/0198136 A1* | 7/2021 | Jani ................. B01D 61/029 |
| 2022/0008867 A1 | 1/2022 | Rahaman et al. |
| 2022/0009813 A1 | 1/2022 | Kostecki et al. |

OTHER PUBLICATIONS

Jae-Wuk Koo, Ji-Hee Han, Taekgeun Yun, Sangho Lee, June-Seok Choi, Integration of forward osmosis with membrane distillation: effect of operating conditions, Desalination and Water Treatment, vol. 51, Issues 25-27, 2013, pp. 5355-5361 (Year: 2013).*

McCutcheon et al., "The Ammonia-Carbon Dioxide Forward Osmosis Desalination Process." Water Conditioning & Purification, Oct. 2006.

\* cited by examiner

THERMAL DRIVEN WATER DESALINATION SYSTEM USING FORWARD OSMOSIS

CROSS-REFERENCE TO RELATED APPLICATIONS

This application is a non-provisional application which claims priority to U.S. Provisional Patent Application No. 63/534,863 filed on Aug. 28, 2023 and U.S. Provisional Patent Application No. 63/622,793, which was filed on Jan. 19, 2024, which are incorporated by reference in their entirety.

FIELD OF THE DISCLOSURE

The present invention relates to a system and method for water desalination using forward osmosis with a lower energy cost, little pre-treatment, and a powerful osmotic pressure draw through the use of an ammonium bicarbonate solution which is recovered for reuse by low cost membrane distillation as well as the use of a heat pump for thermal regulation of temperatures.

BACKGROUND

It is well known that the world has a freshwater scarcity problem. The problem of freshwater scarcity has been exacerbated due to climate change, drought, population growth, and increased industrial demand. It is estimated that globally about 26% of the population do not have safe drinking water and 46% of people lack access to safely managed sanitation.

97% of the water on Earth is contained in the oceans and/or deep saline water aquifers, and is thus undrinkable, because of the high concentration of salt content in the seawater. One option has been to look into pursuing desalination of saltwater to help unlock access to this plentiful supply of potential freshwater. Saltwater is readily available and easy to access. It may be desirable to desalinate saltwater in oceans that surround bodies of land that that have lower amounts of readily available freshwater, such as in the Middle East and Africa in order to provide a greater amount of freshwater. Unfortunately, the high cost and expense associated with desalination of saltwater has always been a problem for the major methods used today.

A known method of desalination of saltwater has been the use of reverse osmosis. Reverse osmosis involves forcing water through a membrane using hydraulic pressure. Forward osmosis is another method of water desalination and involves the use of natural osmotic pressure (very little hydraulic pressure usually) to induce the flow of water through the membrane. Forward osmosis (FO) is an osmotic process that, like reverse osmosis (RO), uses a semi-permeable membrane to effect separation of water from dissolved solutes.

Many issues persist with the use of reverse osmosis. The high pressures required to overcome saltwater's osmotic pressures is expensive and has been a challenge for reverse osmosis. Other methods, which include all distillation methods require high cost of heat to overcome the high cost of achieving latent heat requirements. Electrodialysis requires high electric costs to pull apart the sodium and chloride ions. Forward osmosis shows promise but to date the cost of recovering the draw solution has been too high except for special situations.

Accordingly, there is still need for a system using forward osmosis that uses a low cost of draw solution recovery that overcomes past failures.

SUMMARY

The present description is directed to one or more non-limiting embodiments for a water desalination system that utilizes forward osmosis instead of reverse osmosis for an optimized yield of freshwater product. Further, the method and systems described herein utilize an ammonium bicarbonate solution as a draw solution in a forward osmosis membrane housing. The method and system is maintained under a vacuum which advantageously allows the removal of the ammonium bicarbonate solution, which is the draw solution, from the freshwater in a more efficient manner and with lower temperatures required to affect the removal of the ammonium bicarbonate from the freshwater. Further, the system while maintained under a vacuum, can reuse and redirect the regenerated concentrated ammonium bicarbonate solution multiple times in order to desalinate new or additional amounts of incoming saltwater or contaminated water to the water desalination plant or site. In a non-limiting embodiment, one embodiment utilizes a heat pump to heat diluted ammonium bicarbonate solution that includes a high percentage of desalinated water (freshwater) to a desired temperature before passing the heated solution through a feed side of a hydrophobic membrane housing. In another non-limiting embodiment, the method and system utilizes heat captured from a heat source (e.g., a power plant, nuclear plant, fossil fuel plant, solar cells, or other geothermal sources of heat) to heat the diluted ammonium bicarbonate solution.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
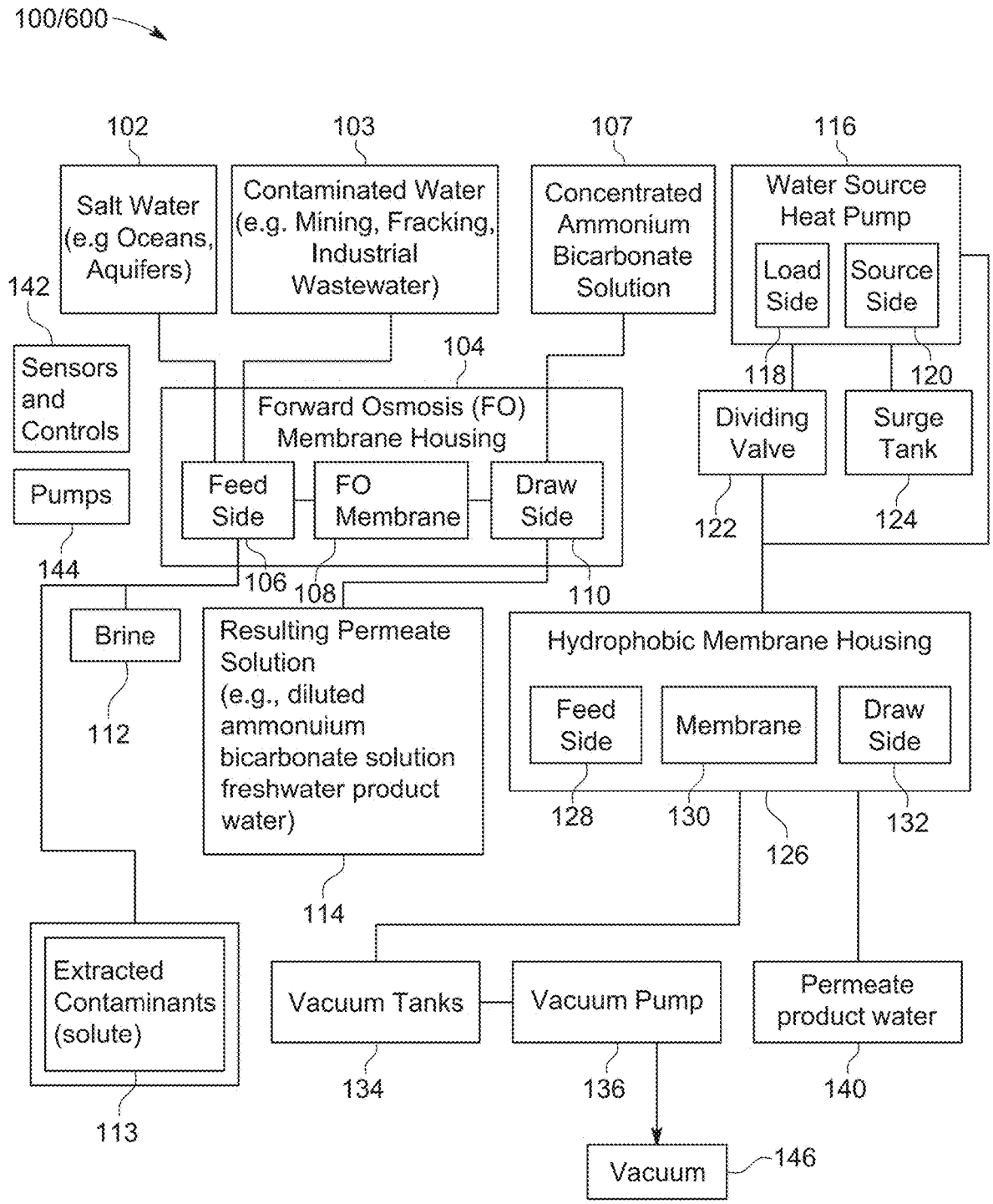
FIG. 1 shows a block diagram of exemplary components of a water desalination system that utilizes forward osmosis and an ammonium bicarbonate solution as a draw solution as well as a water heat pump and a hydrophobic membrane housing to generate freshwater and to recycle and reuse the draw solution.
Figure 2:
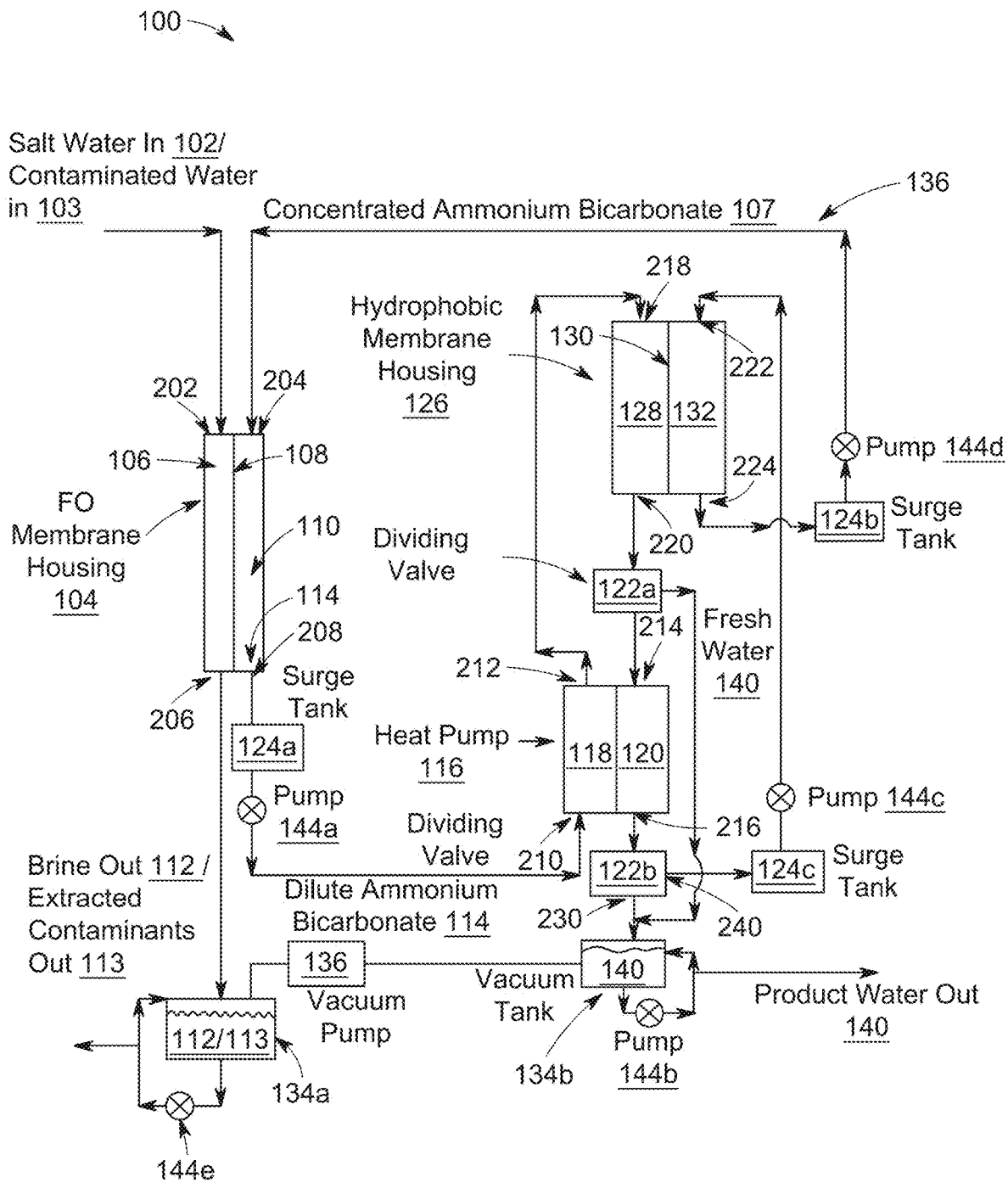
FIG. 2 shows a pictorial illustration flowchart with an exemplary method of use of the water desalination system shown in FIG. 1.

The present description relates to a useful method and system for water desalination using forward osmosis that has the potential to achieve high rates of freshwater recovery from various sources of not fresh water, such as but not limited to, saltwater obtained from oceans and deep sea aquifers, or polluted and/or contaminated water sources, such as mining, fracking, and industrial wastewater. In a non-limiting embodiment, it is believed that the one or more components of the water desalination system (e.g., system 100 as illustrated in FIG. 1 and FIG. 2) may be able to achieve a freshwater recovery rate of 60% or greater. The use of the forward osmosis system will greatly reduce energy costs in comparison with traditional methods for reverse osmosis in part because the present method or system does not require expensive pressure pump systems or heating components and the use of the ammonium bicarbonate as the draw solution is more effective in obtaining a greater amount of freshwater product water for treatment and use.

The method and system as described herein in one or more non-limiting embodiments includes the use of a forward osmosis system to desalinate saltwater (e.g., seawater). In a non-limiting embodiment, the present description describes presenting saltwater under low pressure to a semipermeable membrane on one side and a draw solution (e.g., ammonium bicarbonate solution) on the other. The draw solution draws some of the water through the membrane leaving a more concentrated salt solution behind as wastewater. The draw solution is recovered from the water drawn through the membrane leaving useful salt free water known as permeate water. The recovered draw solution goes back to the membrane to start the process again.

Forward osmosis offers many positive benefits including a lower energy cost (e.g., as compared to reverse osmosis processes) and the fact that little pretreatment is required. However, there are important issues that still must be resolved for forward osmosis to be used as a useful method to desalinate saltwater including the fact that forward osmosis usually under current methods has a low osmotic pressure draw and the cost is high to separate the fresh water from the draw.

The present description proposes that the use of ammonium bicarbonate solutions helps to obtain higher osmotic draw pressure which would make the forward osmosis system a more viable option to desalinate water and less costly to use, in particular for use with high salinity situations such as mining, fracking, and/or industrial wastewater. Additionally, many existing reverse osmosis wastewater plants may be retrofitted or adjusted to the system as described in the Figures below to accommodate the use of forward osmosis (FO) as a compliment to reverse osmosis (RO), which has a lower water freshwater output yield and requires greater energy in comparison with FO systems.

FIG. 1 is a block diagram with one or more components that may be used with the forward osmosis water desalination system 100. FIG. 1 may be viewed in conjunction with the process flow illustrated in FIG. 2 to better understand the overall system 100 according to one or more non-limiting embodiments.

As shown in FIG. 1, water desalination system 100 operates using forward osmosis. Forward osmosis (FO) is a process by which solvent is extracted from solution when the solution is exposed to a forward osmosis (FO) membrane 108 contained in the forward osmosis housing (104). In this instance, the initial solution is either the salt water solution 102 as obtained from any type of salt water source or another type of contaminated water solution 103 obtained from another water source. In a forward osmosis system 100, a feed solution (e.g., salt water 102 or contaminated water 103) is fed through the feed side 106 of the FO membrane housing 104 while a draw solution (e.g. concentrated ammonium bicarbonate solution 107) is fed through the draw side 110 of the FO membrane housing 104. Because the high osmatic draw pressure differences between the draw solution on the draw side 110 of the FO membrane housing 104 and the feed side 106 of the FO membrane housing 108, a percentage or an amount of the water from the salt water solution 102 or from another type of contaminated water solution 103 is pulled through the FO membrane 108 of the FO membrane housing 104, which allows the water 114 pulled into the draw side 110 to be treated and redirected for later use as further explained below.

The salt water solution 102 may be obtained from any source of salt water including without limitation oceans and deep sea aquifers. Any other source of water with high levels of salinity may alternatively be used. The contaminated water solution 103 may be obtained from other types of sources where water may usefully be recovered and treated for reuse. For example, other sources of contaminated water 103 include, but are not limited to, any source of brackish water, wastewater, industrial water, mining, or fracking.

In a non-limiting embodiment, it is intended that the salt water solution 102 processed via the FO system/water desalination system 100 shown in FIG. 1 and in FIG. 2 may be useful in many instances for providing freshwater including potable drinking water. In some instances, the water processed via the FO system/water desalination system 100 may be processed not solely for drinking water but rather for other useful purposes such as irrigation for farming or industrial use or other purposes to which non-potable water may be used. It is foreseeable that there may be a high demand for the desalinated water 140 produced by the water desalination system and method 100 as described herein and shown in the accompanying FIGS. 1-5.

In a non-limiting embodiment, the FO membrane housing 104 is the device or apparatus which contains the FO membrane 108 which physically divides the feed side 106 of the FO membrane housing 104 from the draw side 110 of the FO membrane housing 104. In a non-limiting embodiment, the FO membrane 108 may be a cellulose triacetate membrane. Any other FO membrane 108 may be useful as long as the FO membrane 108 permits water to pass through the FO membrane 108 and leaving salts as brine and retain the ammonium bicarbonate ions that are used on the draw side 110 of the FO membrane housing 104. In a non-limiting embodiment, the FO membrane housing 104 may be a spiral wound membrane, a hollow fiber membrane, or a flat plate membrane, which are existing types of membrane housing devices that may be used for FO membrane housing 104 and which are produced currently by one or more manufacturers. Other types of FO membrane housing 104 as known in the art may alternatively be used instead of those listed above.

Once the salt water solution 102 or other type of contaminated water 103 has been processed through the FO membrane housing 104, it is expected that a percentage of brine 112 or other types of extracted water contaminants 113 will be pulled from the outlet 206 of the feed side 106 of the FO membrane housing 104. The brine solution 112 and/or other types of extracted water contaminants 113 can be directed as needed to other storage tanks, processing facilities, disposal sites, and/or collected for later disposal and/or reuse. Brine 112 as used herein may refer to or indicate a high concentration solution of salt and/or other solid particles.

Brine 112 may contain a certain amount of water in the solution, but there is also a concentration of salt or sodium chloride collected in the brine solution 112 which is one of the goals of using the forward osmosis process in system 100. If the contaminated water solution 103 is directed through the FO membrane housing 104, it is possible that other types of extracted contaminants or extracted solutes 113 are collected instead of only or in addition to the collection of the brine 112. Such contaminants may include any solids or solutes found in mining water, industrial water, wastewater, brackish water, or any other source of contaminated water solution 103.

In a non-limiting embodiment, FIG. 2 illustrates that the brine 112 or the other types of extracted contaminants 113 are directed to a vacuum tank 134a and then can be ejected as needed out of the system 100. Further, explanation about this is provided below with respect to FIG. 2.

The resulting permeate solution 114 that is pumped out of the outlet 208 of the draw side 108 of the FO membrane housing 104, as shown for example in FIG. 2, should primarily constitute freshwater that has a low or negligible percentage of sodium chloride ions such as that found in brine 112 or other extracted contaminants 113. The resulting permeate solution 114 will also include ammonium bicarbonate ions, such that the resulting permeate solution 114 has a desirable amount of desalinated water and also diluted ammonium bicarbonate ions.

In a non-limiting embodiment, the concentrated ammonium bicarbonate solution 107 may comprise at least 25% ammonium bicarbonate in the concentrated ammonium bicarbonate solution 107. In another non-limiting embodiment, the ammonium bicarbonate may comprise between 25%-30% or 30%-35% in the concentrated ammonium bicarbonate solution 107. In a non-limiting embodiment, the ammonium bicarbonate may comprise 35% of the concentrated ammonium bicarbonate solution 107.

The resulting permeate solution 114 may also be referred to as a diluted ammonium bicarbonate solution as a measurable percentage of the water from the salt water 103 and the contaminated water 103 has had a chance to flow through the FO membrane barrier 108 due to the osmotic draw of the draw solution 107 into the draw side 110 of the FO membrane housing 108. Accordingly, with the additional water pulled over into the draw side 110 of the FO membrane housing 108, the concentrated ammonium bicarbonate solution 107, which is pumped and forced to flow into inlet 204 of the draw side 110 of the FO membrane housing 104, becomes diluted.

In a non-limiting embodiment, when the ammonium bicarbonate is diluted, the resulting permeate solution 114 may comprise between 5-10% of ammonium bicarbonate ions. As discussed later herein with respect to FIG. 2 as well, the ammonium bicarbonate ions are caused to vaporize or dissociate into their respective gases of ammonia, carbon dioxide, and water vapor in the hydrophobic membrane housing 126 due to temperature differences between the feed side 128 of the hydrophobic membrane housing 126 and the draw side 132 of the hydrophobic membrane housing 126.

The end goal of the water desalination system 100 is to produce freshwater product water or permeate product water 140 that can be collected for various purposes that would benefit humanity and industry. The permeate product water 140 may be further treated in order to provide a plentiful source of potable water. The permeate product water 140 may be also be left untreated if needed. The permeate product water 140 may be used for irrigation or agriculture and for various industries.

FIG. 1 shows that the water desalination system 100 may further include various sensors and controls 142. The sensors and controls 142 may be various sensors and controls as known by one of ordinary skill in the art to detect and obtain various relevant measurements for the system 100. The one or more pumps 144 are utilized to pump fluid from one point to another in the system 100 as shown for example in FIG. 2. In a non-limiting embodiment, a sensor and controller 142 may be needed to detect various temperatures, including the temperature of salt water 102 and/or contaminated water 103, the temperature of the concentrated ammonium bicarbonate solution 107, and/or the temperature of the resulting permeate solution 114, as well as the temperature of the feed solution for the feed side 128 of the hydrophobic membrane housing 126 and the temperature of the solution entering the draw side 132 of the hydrophobic membrane housing 126. Other temperatures may be read and detected as well in order to adjust one or more variables for the water desalination system 100. Further details regarding temperature may be provided below with respect to the vacuum pump 136 and the creation of a vacuum 146.

Figure 4:
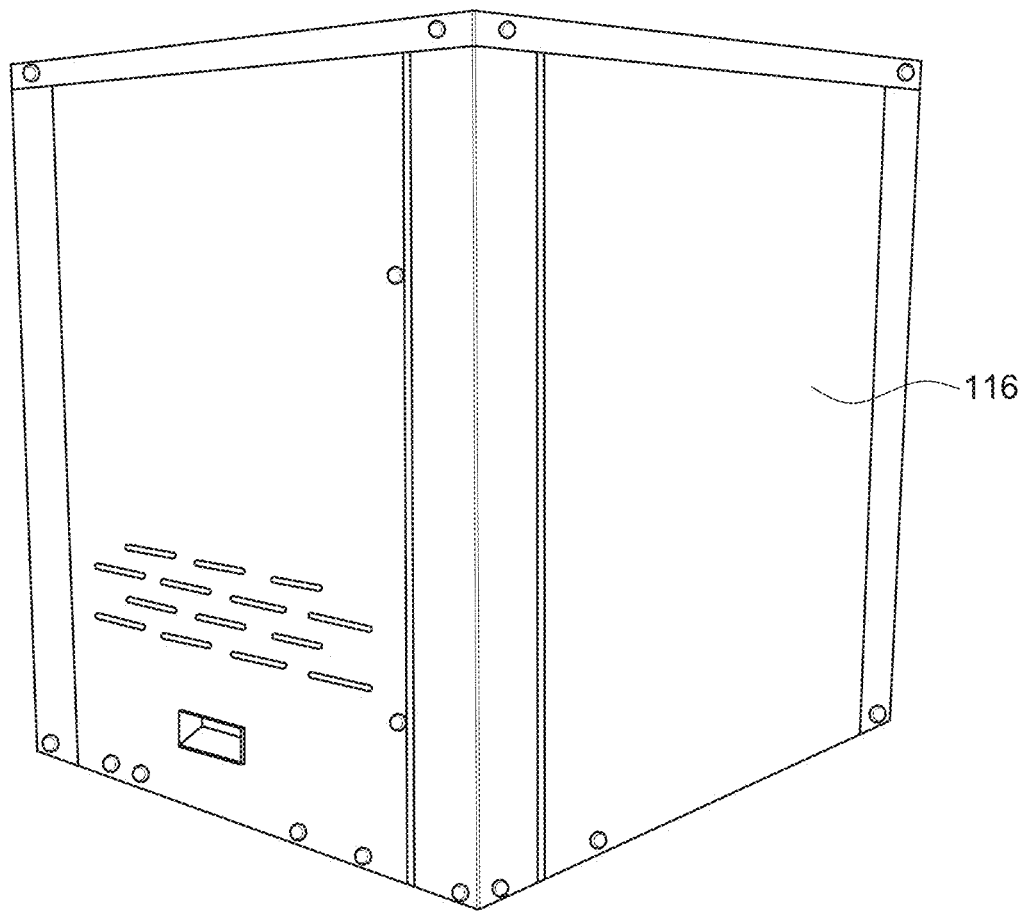
FIG. 4 shows an exemplary water source heat pump.

In a non-limiting embodiment, the system 100 utilizes a water source heat pump 116. FIG. 4 shows an exemplary pictorial illustration of a water heat pump 116. The water source heat pump 116 is not an air to air source heat pump, but rather is designed to allow water and fluid to flow through the heat pump 116 in order to be heated or cooled. The water source heat pump 116 includes a load side 118 and a source side 120, which is further discussed with respect to FIG. 2. The water heat pump 116 further comprises additional equipment conventionally used with a water heat pump, such as a compressor, a refrigerant (e.g. Freon), an expansion valve, in order to extract heat from the water flowing into the source side 120 of the heat pump 116 and transfer that heat to the water flowing into the load side 118 of the heat pump 116.

In a non-limiting embodiment, the water desalination system 100 further includes one or more dividing valves 122 which act to divide flow of the desalinated water/permeate solution 114 and/or other sources of solution and water, including freshwater or permeate product water 140 throughout the water desalination system 100.

The water desalination system 100 may further include one or more surge tanks 124. As known in the art, a surge tank 124 may be a storage reservoir or set of pipes that act to absorb sudden rises of pressure, as well as to quickly provide extra water during a brief drop in pressure. Various surge tanks 124, such as surge tank 124a, 124b, and 124c, are shown in exemplary positions in FIG. 2. Fewer or greater surge tanks 124 may also be utilized or added to the water desalination system 100 as needed.

Figure 3:
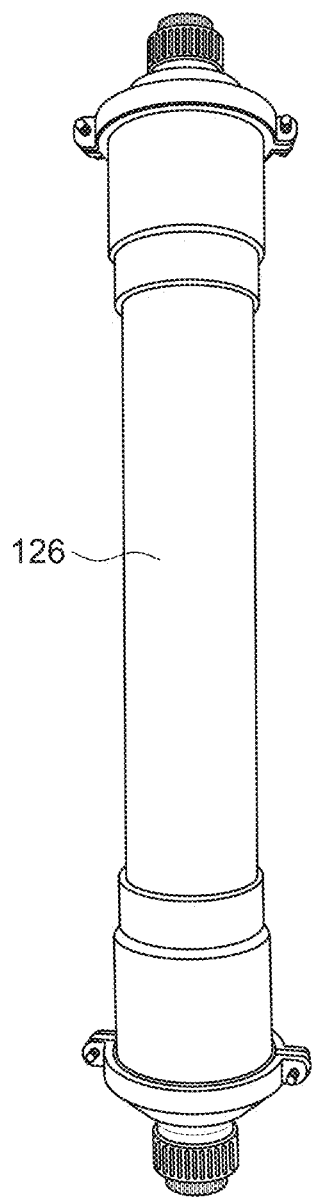
FIG. 3 shows an exemplary hydrophobic membrane.

The water desalination system 100 may further include a hydrophobic membrane housing 126. The hydrophobic membrane housing 126 includes a feed side 128, a hydrophobic membrane 130, and a draw side 132. FIG. 3 shows an exemplary pictorial illustration of a hydrophobic membrane housing 126. Notably, the term "hydrophobic" indicates that the hydrophobic membrane housing 126 includes a hydrophobic membrane 126 capable of repelling water or preventing water from flowing through the hydrophobic membrane 126. The hydrophobic membrane 130 in the hydrophobic membrane housing 126 does permit the flow of gases, however, through the hydrophobic membrane 130. This may be relevant as the ammonium bicarbonate ions are made to disassociate into gas form as ammonia, carbon dioxide, and water vapor within the feed side 128 of the hydrophobic membrane housing 126 and these gases are able to travel through or flow through the membrane 130 of the hydrophobic membrane housing 126 into the draw side 132 of the hydrophobic membrane housing 130. Further information about this process is provided below with respect to FIG. 2.

The hydrophobic membrane 130 may be made of PTFE (polytetrafluoroethylene) in a non-limiting embodiment. PTFE is a coated woven fiberglass membrane that is considered extremely durable. In another non-limiting embodiment, the hydrophobic membrane 130 may be made of polyvinylidene fluoride (PVDF). Both types of membranes, whether PTFE or PVDF, are intended to be hydrophobic and not allow water to flow through the membrane 130 itself, but the water solution can still flow into and out of the feed side 128 and the draw side 130 of the hydrophobic membrane housing 126. The term "housing" as used herein refers to the apparatus or device container that contains the membranes 108 or 130.

It is noted, that the FO membrane 108 in the FO membrane housing 104 shown in FIG. 1 and in FIG. 2 is hydrophilic and can allow water flow to flow through the FO membrane 108 and is not a hydrophobic membrane.

In a non-limiting embodiment, the water desalination system 100 requires a vacuum 146 to be created and maintained during the water desalination process 100 and pumping out of the freshwater/product water 140. In a non-limiting embodiment, one method of producing a vacuum 146 is to activate at least one vacuum pump 136 as needed. The water desalination system 100 may further utilize another vacuum tank 134b, which acts as a reservoir or collection tank for the product water 140 and is also pictured in FIG. 2.

Turning to FIG. 2, FIG. 2 provides a pictorial flowchart of a method for desalinating salt water 102 or other contaminated water 103 according to one or more non-limiting embodiments. In a non-limiting embodiment, it may first be useful for the vacuum 146 to be created. The vacuum 146 may be created by turning on at least one or more vacuum pumps 136. In a non-limiting embodiment, it may be useful for a surge tank such as surge tank 124b or any other surge tank 124 in the water desalination system 100 to include an initial amount of concentrated ammonium bicarbonate 107 that helps to balance the pressure and flow in the water desalination system 100 upon commencement and creation of the vacuum 146.

The water desalination system 100 may begin with surge tank 124a being filled with an initial amount of diluted ammonium bicarbonate solution 114 and the surge tank 124b being filled with an initial amount of concentrated ammonium bicarbonate solution 107. Further, the source side 120 of the water heat pump 116 is also filled with water.

Next, the process may begin by pumping and flowing an amount of salt water 102 or contaminated water 103 from one or more sources (e.g., oceans, aquifers, contaminated water sources) into an inlet 202 of the feed side 106 of the FO membrane housing 104. At the same time or approximately simultaneously, an amount of concentrated ammonium bicarbonate 107 is also pumped from the surge tank 124b and allowed to flow into an inlet 204 of the draw side 110 of the FO membrane housing 104. Because the ammonium bicarbonate in the concentrated ammonium bicarbonate solution 107 acts as a powerful osmotic draw solution, a high percentage of the water contained in the salt water 102 and/or contaminated water 103 flowing through the feed side 106 of the FO membrane housing 104 is caused to flow cross ways through the permeable membrane 108 of the FO membrane housing 104 and into the draw side 110 of the FO membrane housing 104 as part of the forward osmosis process.

In a non-limiting embodiment, brine 112 emerges from an outlet 206 of the feed side 106 of the FO membrane housing 104 when the salt water 102 is the feed solution. In other non-limiting embodiments, other extracted contaminants 113 may be pulled out of or pumped out of the outlet 206 of the feed side 106 of the FO membrane housing 104 when other sources of contaminated water 103 are fed through or directed through the feed side 106 of the FO membrane housing 104.

As part of the forward osmosis process, the resulting permeate solution 114 is allowed to flow out of the outlet 208 from the draw side 110 of the FO membrane housing 104. As shown in FIG. 2 and as referred to herein, the resulting permeate solution 114 may also be referred to as the diluted ammonium bicarbonate solution in that the resulting permeate solution 114 has a diluted amount of ammonium bicarbonate ions/compounds in comparison with the concentrated ammonium bicarbonate solution 107 which acted as the draw solution initially in the draw side 110 of the FO membrane housing 104. As noted above, in a non-limiting embodiment, the percentage of concentrated ammonium bicarbonate ionic compounds may be approximately 25-35% whereas the percentage of diluted ammonium bicarbonate ionic compounds may have been reduced to 5-10% after the additional water is pulled into the draw side 110 of the FO membrane housing 104 from the flowing salt water 102 and/or contaminated water 103.

It is expected that in one or more non-limiting embodiments, about 30-40% of brine 112 is extracted and made to flow from the outlet 206 of the feed side 106 of the FO membrane housing 104, whereas about 60-70% of the resulting permeate solution 114 is made to flow from the draw side 108 of the FO membrane housing 104. This is considered a higher draw result than systems that use reverse osmosis (RO) as their method of osmosis, because RO systems tend to only be able to obtain about 40-45% of freshwater, product water 140, whereas the water desalination system 100 using ammonium bicarbonate as the draw solution and forward osmosis as shown in herein is expected to yield 60-70% of freshwater, useable product water 140.

FIG. 2 shows that the brine 112 and/or other extracted contaminants 113 are directed to a first vacuum tank 134a before pumping or flowing a volume of the collected brine 112 and/or contaminants 113 from the system 100. In a non-limiting embodiment, the vacuum tank 134a is in fluid communication with the exemplary vacuum pump 136 that can create a vacuum 146 in the overall system 100. The vacuum pump 136 is also in fluid communication with the second vacuum tank 134b, as shown in FIG. 2. As shown therein, the brine solution 112 and/or extracted contaminants solution 113 partially fills the first vacuum tank 134a. The product water 140 is directed into and partially fills the second vacuum tank 134b. The presence of the first vacuum tank 134a and the second vacuum tank 134b being in fluid communication with the at least one vacuum pump 136 is useful and advantageous to have the same vacuum pressure on both sides of the FO membrane housing 104.

In a non-limiting embodiment, after the resulting solution 114 flows out of the draw side 110 of the FO membrane housing 104, the resulting solution 114 may flow through the first surge tank 124a and may be pumped via a first exemplary pump 144a towards the water heat pump 116.

The resulting permeate solution 114 is directed into an inlet 210 of the load side 118 of the water heat pump 116 as shown in FIG. 2. The temperature of the resulting permeate solution 114 is raised or heated by the water heat pump and upon release from the outlet 212 of the load side 118 of the water heat pump 116, the temperature of the resulting permeate solution 114 may be higher than the temperature of the resulting permeate solution 114 which flowed out of the outlet 208 of the FO membrane housing 104. Thus, the water heat pump 116 heats the incoming amount of resulting permeate solution 114. In a non-limiting embodiment, the diluted permeate solution 114 (which is also the ambient seawater with removed brine solution 112 or other contaminants 113) may receive a transfer of heat in the water heat pump 116 from the source side 120 such that the heat transfers to the diluted permeate solution 114 flowing through the load side 118 of the water heat pump 116 from the source side 120.

The product water 140 that comes back into the source side 120, as further discussed below, may be a source of heat in the water heat pump 116 and is cooled below ambient temperature when exiting an outlet of the source side 120 of the water heat pump 116.

The heated resulting permeate solution 114 is pumped and directed to an inlet 218 of a feed side 128 the hydrophobic membrane housing 126. The heated resulting permeate solution 114 acts as warm liquid feed within the feed side 128 of the hydrophobic membrane housing 126.

Generally, at the same time, cooler water (including fresh water 140 generated by the system) is directed into an inlet 222 and through the draw side 132 of the hydrophobic membrane housing 126. As noted above, the resulting permeate solution 114 when flowing through the feed side 128 of the hydrophobic membrane housing 126 is at a higher temperature than the temperature of the incoming water flowing through the draw side 132 of the hydrophobic membrane housing 126.

Due to the heat being dissipated and the heat differential and the fact that the water desalination system 100 is maintained under a vacuum 146, the ammonium bicarbonate ions in the resulting permeate solution 114 vaporize or disassociate into their respective gas form of ammonia, carbon dioxide, and water vapor. The gases (e.g., ammonia, carbon dioxide, and water vapor) can permeate cross-ways through the hydrophobic membrane 130 of the hydrophobic membrane housing 126 into the draw side 132 of the hydrophobic membrane housing 126. The disassociation process that occurs due to temperature differences and orientation of the solution 114 with respect to the cooler water flowing into the draw side 132 of the hydrophobic membrane housing 126 functions to remove the ammonium bicarbonate ions from the resulting solution 114 so that fresh product water 140 can flow out of the outlet 220 of the feed side 128 of the FO membrane housing 126 without any or with a negligible amount of ammonium bicarbonate ions in the product water 140 that can be further produced and treated for later use. Thus, the temperature difference and the hydrophobic membrane 130 of the hydrophobic membrane housing 126 is used as a means to remove the ammonium bicarbonate ions from the freshwater product 140.

The fresh product water 140 is directed to a first dividing valve 122a in a non-limiting embodiment. At which point, a first amount of fresh product water 140 is directed into an inlet 214 of the source side 120 of the water heat pump 116 and allowed to flow out of the outlet 216 of the source side 120 of the water heat pump 116. The first amount of fresh product water 140 that flows through the source side 120 of the water heat pump 116 is cooler than the water/solution 114 flowing through the load side 118 of the water heat pump 116 and continues to lose heat and become cooler as the first amount of fresh product water 140 flows out of the outlet 216 of the source side 120 of the water heat pump 116.

The second amount of fresh product water 140, as shown in FIG. 2, may be bypassed from the water heat pump 116 and redirected in part to flow to surge tank 124c and also another portion of the second amount of fresh product water 140 may be pumped (e.g., via pump 144c) back up into inlet 218 of the draw side 132 of the hydrophobic membrane housing 126 to help further replenish and supply the cool water that will continuously be used in the water desalination system 100 to produce additional fresh, product water 140. It is noted that the presence of the first dividing valve 122a is useful to help to regulate the temperature of the solution flowing through the draw side 132 of the hydrophobic membrane housing 126 and to keep the temperature of the solution flowing through the draw side 132 of the hydrophobic membrane housing 126 at a cooler temperature. If needed, additional amounts of fresh water 140 can be bypassed from flowing through the source side 120 of the water heat pump 116 in order to regulate the cold temperature. Accordingly, the dividing valve 122a helps to regulate the temperature of the source water flowing in the source side 120 of the water heat pump 116 which is also the same water redirected to the draw side 132 of the hydrophobic membrane housing 126.

In a non-limiting embodiment, the first amount of freshwater product water 140 is directed to a second dividing valve 122b. After exiting point 230, as shown in FIG. 2, from the second dividing valve 122b, the freshwater product water 140 may be directed to a vacuum tank/collection tank 134b.

In a non-limiting embodiment, the freshwater product water 140 is contained in the second vacuum tank 134b and pumped around one or more times or directed in and out of the vacuum tank 134b one or multiple times at a higher flow rate and pressure so as to allow certain volumes of fresh product water 140 to be pumped out and collected at another collection point or storage area. The use of the vacuum tank 134b and one or more pumps 144b may be useful as shown in FIG. 2 in order to allow for fresh, product water 140 to be pumped out when under a vacuum 146 as maintained in the water desalination system 100. Typically, it is not possible to pull out the volumes of freshwater product water 140 from a system under a vacuum 146, but the use of the vacuum tank 134b and the directing of the freshwater, product water 140 around and around as shown in FIG. 2 and pumped via one or more pumps 144b, before pulling out a certain volume of freshwater product 140 enables the extraction of the freshwater product water 140 without difficulty or disrupting of the vacuum 146.

Similarly, the brine water solution 112 and/or the extracted contaminations solution 113 is first directed into the first vacuum tank 134a and pumped in and out one or more times (e.g. multiple times) in order to pump the brine solution 112 and/or the extracted contaminants solution 113 at a higher flow and pressure while still maintaining a vacuum 146 and still being able to extract the brine solution 112 and/or contaminants solution 113.

Notably, the vacuum tanks 134a, 134b are not filled entirely or to the maximum extent with either brine solution 112/contaminant solution 113 (e.g. for the vacuum tank 134a) or product water 140 (e.g. for the vacuum tank 134b). Rather, the vacuum tanks 134a, 134b are only partially filled in order to still be able to create and maintain a vacuum 146 using the vacuum pump 136, in which case there does need to be an amount of air in both vacuum tanks 134a, 134b in addition to the contained fluid.

Notably, for the FO membrane housing 104 and the hydrophobic membrane housing 126, these devices 104 and 126 can be filled with their respective solutions/water.

In addition to directing the freshwater product water 140 to the vacuum tank 134b, FIG. 2 shows that the dividing valve 122b at exit point 240 may direct a portion of the freshwater product water 140 to the surge tank 124c which can, in one non-limiting embodiment, pump the water to the inlet 222 of the feed side 132 of the hydrophobic membrane housing 126 to further provide cooler water and temperature to cause the reassociation of ammonium bicarbonate ions present in the feed side 128 of the hydrophobic membrane housing 126. Alternatively, and additionally, some volume of the product water 140 is directed to the surge tank 124b and pumped via one or more pumps, such as pump 144d, back to the inlet 204 of the draw side 110 of the FO membrane housing 104 to act as a new draw solution for additional forward osmosis to occur with a new amount of salt water 102 and/or contaminated water 103 that is meant to be desalinated.

It is noted that when the ammonium bicarbonate ions from the heated resulting permeate solution 114 (e.g. flowing through the inlet 218 of the feed side 128 of the hydrophobic membrane housing 126) disassociate into gases that permeate through the hydrophobic membrane 130 of the hydrophobic membrane housing 126, the gases pass to the draw side 132 where the gases reassociate and condense back into ammonium bicarbonate ions. The resulting solution having the condensed ammonium bicarbonate ions passes through the outlet 224 of the draw side 132 of the hydrophobic membrane housing 126 and the solution is directed to the surge tank 124b, as shown in FIG. 2 in a non-limiting embodiment, and pumped back to the inlet 204 of the draw side 110 of the FO membrane housing 104. In this manner, the same ammonium bicarbonate ions are utilized in a circular manner and forced to dissociate and reassociate or condense in the same hydrophobic membrane housing 126 due to differences in temperature of the ammonium bicarbonate solution 114 in the feed side 128 of the hydrophobic membrane housing 126 as compared with the cooler water flowing into and through the draw side 132 of the hydrophobic membrane housing 126. Further, the disassociation process gives off latent heat which helps to cool the solution contained in the draw side 132 of the hydrophobic membrane housing 126 and for the ammonium bicarbonate ions to condense and reform on the draw side 132 of the hydrophobic membrane housing 126.

The system 100 generally aims to have temperatures remain a little above and a little under ambient temperatures. The temperature difference in the hydrophobic membrane housing 126 is a driving force that passes the ammonium bicarbonate gases through the hydrophobic membrane 130. Further, generally the same water from the dilute solution 114 and from the product water 140 is recycled through the system 100 and the water heat pump 116 as the load and source of heat.

Notably, because the water desalination system 100 is maintained continuously under a vacuum 146, the temperature that the ammonium bicarbonate ions disassociate to become gases (e.g., ammonia, carbon dioxide, and water vapor) is lower in a vacuum 146 than the temperature that would be required for the ammonium bicarbonate ions to disassociate when a vacuum 146 is not maintained. This is one of the reasons why the water desalination system 100 shown in FIG. 1 and in FIG. 2 requires less energy than typical reverse osmosis or even forward osmosis systems. There is less need for high energy usage in the process shown in FIG. 2.

In a preferred non-limiting embodiment, the temperature of the salt water 102 and/or contaminated water 103 flowing into the feed side 106 of the FO membrane housing 104 may be at ambient temperature. Likewise, the temperature of the concentrated ammonium bicarbonate 107 flowing into the draw side 110 of the FO membrane housing 104 may also be regulated via one or more sensors and controls 142 to be at ambient temperature. When the resulting solution 114 exits at the outlet 208 of the draw side 110 of the FO membrane housing 104, the temperature of the resulting solution 114 has not been raised by the forward osmosis process that occurred in the FO membrane housing 104. As such the temperature of the resulting permeate solution 114 is the same and at ambient temperature as the temperature of the incoming solutions into the feed side 106 and the draw side 110 of the FO membrane housing 104. The temperature of the resulting solution 114 when entering the inlet 210 of the load side 118 of the water heat pump 116 is also at ambient temperature. However, the temperature of the resulting solution 114 is raised and heated so that the temperature of the resulting solution 114 (or diluted ammonium bicarbonate solution) is higher than ambient temperature after flowing through the load side 118 of the water heat pump 116 and when exiting at the outlet 212 of the load side 118 of the water heat pump 116. The temperature of the heated resulting solution 114 may not be significantly higher but may be in the range of 10-15 degrees higher than ambient temperature in one or more non-limiting embodiments.

It is noted that the temperature of the resulting permeate solution 114 has to be raised to a minimum threshold level of 70 degrees Fahrenheit for the ammonium bicarbonate ions to disassociate into gases when in a vacuum 146. Thus, when the diluted ammonium bicarbonate solution 114 is directed through the feed side 128 of the hydrophobic membrane housing 126, the diluted ammonium bicarbonate solution 114 must be maintained at that minimum threshold level for the vaporization or disassociation to occur. The minimum threshold level for ammonium bicarbonate ions to fully dissociate may be from 156 F with no vacuum down to 70 Fahrenheit under a very high or deep vacuum 146. In a non-limiting embodiment, the range of the vacuum 146 may be between. 5 to 2.0 psi.

Notably, if the water desalination system 100 was not maintained in a vacuum 146, the minimum threshold temperature level to cause the ammonium bicarbonate ions in the diluted ammonium bicarbonate solution/resulting permeate solution 114 to disassociate into gases would be much higher. For example, the minimum threshold level when not under a vacuum would be approximately 156 Fahrenheit, which would require greater energy loads and heating by the water heat pump 116. As such, it is an advantage that the vacuum 146 is continuously maintained in the water desalination system 100 and the minimum threshold level for the ammonium bicarbonate ions to disassociate into their respective gases is lower such that the temperature of the diluted ammonium bicarbonate solution 114 passing through the inlet 218 of the feed side 128 of the hydrophobic membrane housing 126 is not as high as when a vacuum 146 is not continuously maintained. This directly translates into savings in cost for not having to heat the solution 114 as high as would be required if a vacuum 146 is not maintained in a non-limiting embodiment.

In a non-limiting example, the diluted ammonium bicarbonate solution 114 may flow into the load 118 side of the water heat pump 116 at approximately 70 degrees Fahrenheit (at ambient temperature while also being under a vacuum 146). The freshwater product water 140 may be flowing into the source side 120 of the water heat pump 116 at 70 degrees Fahrenheit from the outlet 224 of the draw side 132 of the hydrophobic membrane housing 126. The water heat pump 116 utilizes its internal equipment to cool the water from 70 degrees Fahrenheit to approximately 60 degrees Fahrenheit. Accordingly, one of the uses for the cooler water flowing out of the source side 120 of the water heat pump 116 is to re-routed some of the cooler water as needed to the draw side 132 of the hydrophobic membrane housing 132. Approximately 10 degrees of heat is transferred from the source side 120 of the water heat pump 116 to the load side 118, so that the diluted ammonium bicarbonate solution 114 is raised to about 80 degrees Fahrenheit.

The heated diluted ammonium bicarbonate solution 114 that is around 80 degrees Fahrenheit is directed into the feed side 128 of the hydrophobic membrane housing 126 and loses about 10 degrees Fahrenheit in latent heat when the ammonium bicarbonate ions in the diluted ammonium bicarbonate solution 114 disassociate and become gases, such that the resulting freshwater 140 (minus the ammonium bicarbonate ions) exiting the feed side 128 of the hydrophobic membrane housing 126 is approximately 70 degrees Fahrenheit again or at ambient temperature (and as noted above flows into the source side 120 of the water heat pump 116 at that same ambient temperature). This is one of the reasons that the water heat pump 116 has a potentially higher coefficient of performance (COP) using the systems 100, 600 as shown in FIG. 1 and in FIG. 6 and as described herein. The cooler water flowing into the draw side 132 of the hydrophobic membrane housing 126, as noted above, is approximately 60 degrees Fahrenheit and picks up the 10 degrees in latent heat when the ammonium bicarbonate ions condense and reform so that the resulting concentrated ammonium bicarbonate solution 107 flowing out of the draw side 132 of the hydrophobic membrane housing 126 is approximately 70 degrees or ambient temperature, which is what is desired when re-routing the concentrated ammonium bicarbonate solution 107 is the same temperature as the incoming salt water 102/contaminated water 103.

It is advantageous that the water desalination system 100 described and shown in the accompanying Figures utilize a forward osmosis process as opposed to reverse osmosis. A comparison of the advantages offered by the forward osmosis process is provided below. Notably, the osmotic pressure for the forward osmosis process is much higher (e.g., 230 atm or atmospheres) in comparison with 50.4 atm for a reverse osmosis process.

A set of four, non-limiting reasons are provided below why the proposed forward osmosis system can deliver a low-cost solution that primarily relate to the chemistry of the draw solutions. There are several other reasons why there would be lower cost that will be discussed in the description of how the system operates.

The proposed draw solution of ammonium bicarbonate has these characteristics. The ammonium bicarbonate solution 107 has a high osmotic pressure potential. This is due to many reasons including the following. First, the mole weight of ammonium bicarbonate is 96.09 vs sodium chloride of 58.43, which is therefore 1.6 times higher. This alone increases osmotic pressure of solutions of ammonia bicarbonate over sodium chloride. Second, there are 3 ammonium bicarbonate ions disassociated compared to 2 ions disassociated with sodium chloride. The number of ions disassociated is used as the van't Hoff factor in computing osmotic pressure. In this case osmotic pressure is increased by 1.5 times. Third, the temperature needs to be increased later on to recover the ammonium bicarbonate ions from the permeate water 140. This increases osmotic pressure by close to 1.02 times. Fourth, the maximum solubility of ammonium bicarbonate in water at 86 degrees Fahrenheit is 277 grams/liter whereas seawater/saltwater 102 is 35 grams/liter, 8 times greater. This high concentration of ammonium bicarbonate makes it a powerful draw solution. Fifth, the combination of higher mole weight, greater number of ions, higher temperatures, and high solubility in water using ammonium bicarbonate gives it an exceedingly high osmotic pressure and powerful draw solution for use in forward osmosis. Maximum osmotic pressure is about 284 atmospheres compared to 29 atmospheres for seawater/saltwater 102.

Another reason why ammonium bicarbonate has high osmotic pressure potential is that the vaporization temperature of ammonia bicarbonate begins to disassociate at 107 degrees Fahrenheit and fully disassociates at 156 degrees Fahrenheit at standard pressure and can disassociate at as low as 70 degrees Fahrenheit under a vacuum 146. This is far less than the vaporization temperature of water of 212 degrees Fahrenheit of water.

Another reason why ammonium bicarbonate has high osmotic pressure potential is that one does not need to vaporize all the permeate water like most heat methods of desalination currently do. Only the remaining amount of ammonia carbonate in the permeate water needs to be vaporized. This amounts to about 5 to 10% of dilute ammonium bicarbonate solution vs 100% is vaporization of all the permeate water. This saves an enormous amount of latent heat.

An additional reason why ammonium bicarbonate has is that the latent heat is easy to recover and is almost 100%. When ammonium bicarbonate solution dissociates with heat, it creates carbon dioxide, ammonia, gases and water vapor. This is an endothermic reaction that cools the remaining water and places latent heat into the carbon dioxide and ammonia gases. The remaining water is the permeate water.

When the gases cool, they become ammonium bicarbonate ions, and are mixed with water, and the latent heat is recaptured, which helps to warm the newly reconstituted ammonium bicarbonate concentrated solution 107. This is known as an exothermic reaction. This reconstrued concentrated ammonium bicarbonate solution 107 is then fed back to the FO membrane 108 to start the desalination forward osmosis process again as shown in FIG. 2. Only a small portion of the latent heat is lost because it is recovered. The chemistry for this reaction is shown below.

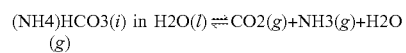
(NH4)HCO3(*i*) in H2O(*l*) ⇌ CO2(*g*)+NH3(*g*)+H2O (*g*)

As noted above, an ammonium bicarbonate solution is used as the draw solution for many due to its high osmotic draw pressure. The osmotic pressure of ammonium bicarbonate is about 3,380 psi compared to seawater of 429 psi. This difference is a powerful draw to draw pure water through a FO membrane 108. Secondly, ammonium bicarbonate produces high recovery water. Ammonium bicarbonate draw provides a 60-70% freshwater recovery rather than a 40-45% recovery that a standard reverse osmosis (RO) system provides due to its high osmotic pressure. Thirdly, ammonium bicarbonate only requires a low temperature for separation. A water heat pump 116 operating at small temperature differentials can achieve a very efficient coefficient of performance (e.g. coefficient of performance (COP) of the water pump 116 of 10 or above at these low temperatures). At desalination sites closer to the equator, the ocean temperatures can be high enough that little heat is required to recover the ammonium bicarbonate solution.

It is noted that the water heat pump 116 also has a high COP because of the recycling of the product water 140 through the source side 120 to further provide a transfer of heat to the load side 118 of the water heat pump 116 whereby the incoming resulting permeate water solution 114 is only at ambient temperature and only has to be raised about ten degrees higher to be directed to the feed side 128 of the hydrophobic membrane housing 126.

Thus, there are many advantages associated with the desalination system 100 shown herein using forward osmosis and ammonium bicarbonate solutions as the draw solution as well as the thermal driven method under a vacuum 146. Less energy and lower pressure is required to drive the forward osmosis system 100 shown in FIG. 1 and in FIG. 2 as compared with a reverse osmosis system. These low pressures mean the system 100 uses far less energy to drive the pumps than RO systems. Although the heat pump increases energy usage, it does it at a highly efficient ten units of energy used for every one unit of energy used. In addition, a substantial portion of the energy used is recovered, so little is lost.

Additionally, another important advantage is that there may be less need to pre-filter the feed seawater or salt water 102. Because the pressures are so low, the feed seawater or saltwater 102 (and/or contaminated water 103) is much more forgiving from fouling the membranes 108 of a FO membrane housing 1204 than for a reverse osmosis system.

Additional advantages include lower plumbing/pump capital cost. The low pressures of a forward osmosis water desalination system 100 allow for low-pressure pumps, pipes, valves, meters, and membrane housings at a substantially reduced cost. In addition, these costs can be spread over more fresh water produced, which is 60% for the forward osmosis system versus the 40% water yield obtained from existing reverse osmosis systems.

An additional advantage is the lower cost of water intake and outlet capital costs. The same capital cost of water intake and outtakes can be spread over a higher volume of fresh water produced.

Additionally, a second stage can increase fresh product water to 76% or higher. By running the brine water 112 into a duplicate and separate forward osmosis system the fresh product water produced can go from 60% to 76% or higher, and the brine water goes up to about 140 ppm.

The water desalination system 100 may be notably beneficial for the use of its low energy cost and high efficiency water heat pump 116 and forward osmosis process 100 shown in FIG. 1, FIG. 2 and in FIG. 4. It may be useful to site any water desalination plants or factories that use the process 100 shown in FIGS. 1-5 near warm ocean water when possible, including, locating in the Middle East, Africa, Florida, and other locations with access to warm ocean water. However, it is still possible to have water desalination plants that utilize the water desalination process 100 shown in FIGS. 1-5 near other sources of water that are also colder in temperature.

In a non-limiting embodiment, it is noted that zeolites may be used to absorb any residuals with the ammonium bicarbonate forward osmosis process. In addition, electrodialysis or reverse osmosis could be employed for final polishing at very low cost due very low levels of residuals remaining.

There are various ways to deploy the water desalination system 100 shown in FIGS. 1-5 and described in one or more non-limiting embodiments herein. First, the water desalination system 100 may be deployed as a first stage system to desalinate any body of water containing salt water 102 and/or contaminated water 103. Additionally, it may be deployed as a $1^{st}$ and 2nd stage system for greater water recovery or deployed to further desalinate RO brine wastewater in existing RO plants. Additionally, the system 100 may be deployed for high TDS (total dissolved solids) situations such as fracking and mining. The system 100 may also be used for processing wastewater from mines, fracking water, and other types of industrial wastewater. Further, the system 100 may be used to add on to existing reverse osmosis desalination plants, standalone, or simultaneous with reverse osmosis for high salinity requirements plants.

Figure 5:
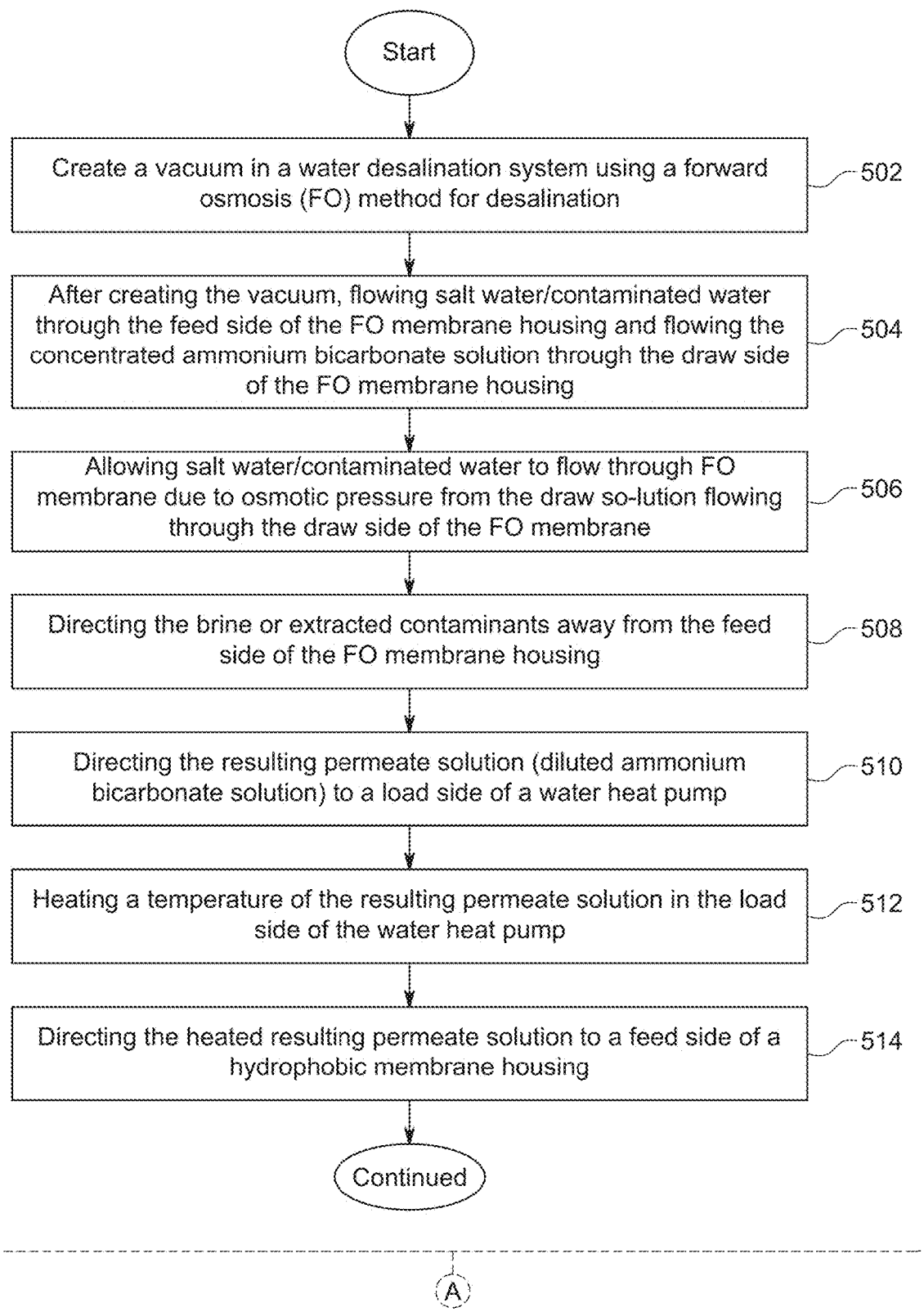
FIG. 5 shows an exemplary flowchart for a method of use of forward osmosis for water desalination using ammonium bicarbonate as a draw solution and a recycling process that is thermal driven with the use of a water heat pump.
Figure 5:
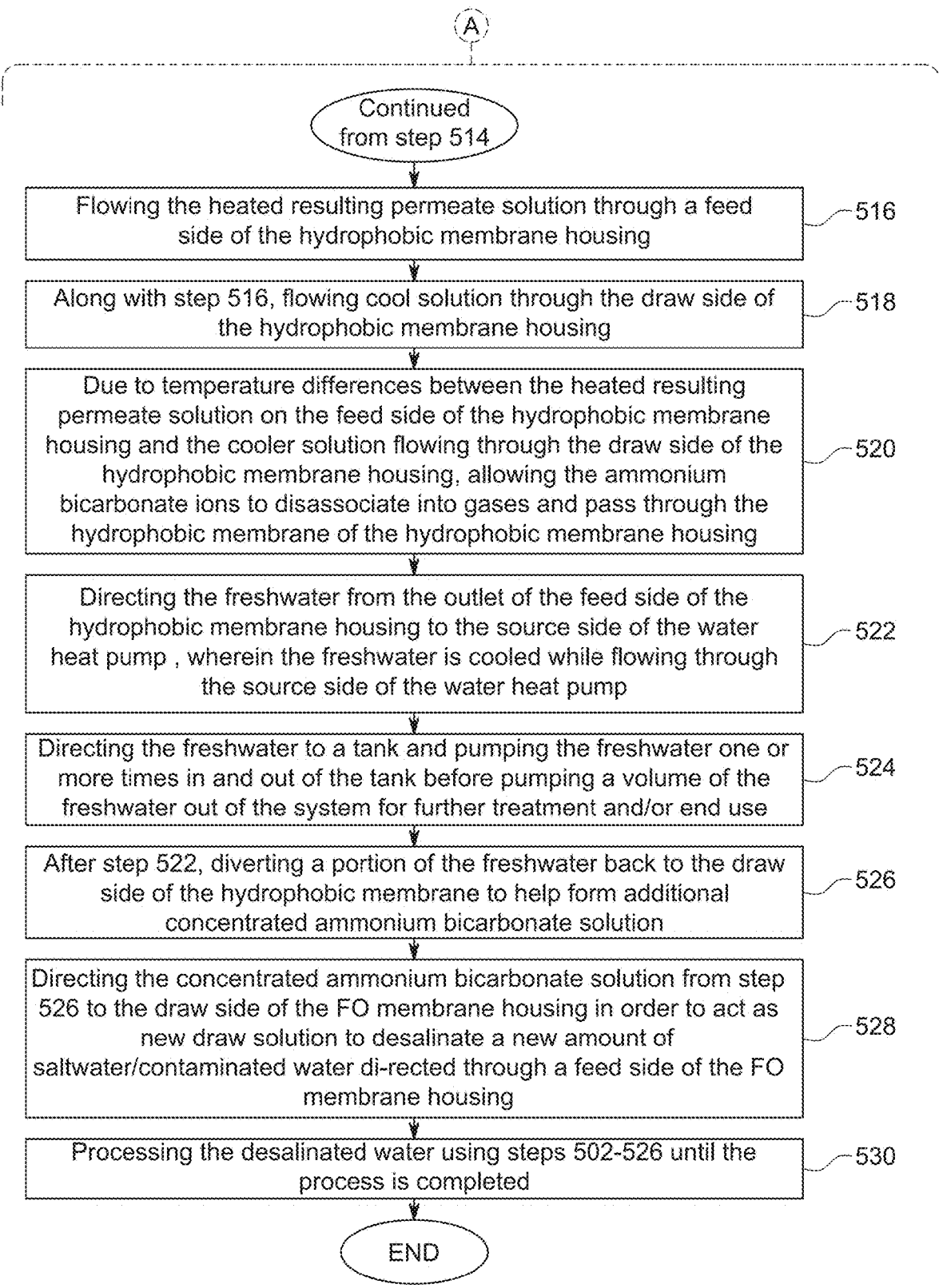

FIG. 5 is an exemplary flowchart having an exemplary method of using the forward osmosis water desalination system 100 as previously described in one or more non-limiting embodiments and as shown herein. The process may begin at step 502, in which a vacuum 146 is created. The system 100 may utilize one or more vacuum pumps 136 to aid in the creation of the vacuum 146. Even if the vacuum pump 136 is deactivated occasionally, a vacuum 146 may be continuously maintained in a preferred embodiment. The vacuum pump 136 may be activated and deactivated as needed in certain cases in order to ensure that the temperature is high enough to disassociate the ammonium bicarbonate into gases.

In a non-limiting embodiment, salt water 102 and/or contaminated water 103 is allowed to flow through the feed side 106 of the FO membrane housing 104 which is shown at step 504. At the same time, after the vacuum 146 is created. the concentrated ammonium bicarbonate solution 107 is pumped through or allowed to flow through the draw side 108 of the FO membrane housing 104 (e.g., as shown in FIG. 2). Due to the high osmotic draw pressure of the concentrated ammonium bicarbonate solution 107, a percentage of the water from the saltwater 102 and/or contaminated water 103 is pulled through the FO membrane 108 of the FO membrane housing 104 to form the resulting permeate solution 114 as shown at step 506. At step 508, a percentage of brine 112 and/or other extracted contaminants 113 is directed away from the feed side 106 of the FO membrane housing 104.

At step 510, the resulting permeate solution 114 (which is the diluted ammonium bicarbonate solution) is directed to a load side 118 of the water heat pump 116. At step 512, the temperature of the resulting permeate solution 114 is heated in the load side 118 of the water heat pump 116. In a non-limiting embodiment, there is a transfer of heat from the source side 120 of the water heat pump 116 to the load side 118 of the water heat pump 116. At step 514, the heated resulting permeate solution 114 is directed to a feed side 128 of the hydrophobic membrane housing 126. At step 516, the heated resulting permeate solution 114 is allowed to flow through the feed side 128 of the hydrophobic membrane housing 126. At step 518, a cooler water solution (including freshwater 140 that has been redirected by a dividing valve 122b back into the draw side 132 of the hydrophobic membrane housing 126) is allowed to flow through the draw side 132 of the hydrophobic membrane housing 126.

At step 520, due to the temperature differences between the heated resulting permeate solution 114 on the feed side 128 of the hydrophobic membrane housing 126 and the cooler solution (e.g. 140) flowing through the draw side 132 of the hydrophobic membrane housing 126, the ammonium bicarbonate ions in the diluted ammonium bicarbonate solution (i.e. resulting permeate solution) 114 are caused to vaporize or disassociate into gases in the feed side 128 of the hydrophobic membrane housing 126. The gases comprise ammonia, carbon dioxide, and water vapor. The gases (but not the remaining water 140) pass through the hydrophobic membrane 130 as part of the process and eventually the gases reform or condense back into the ammonium bicarbonate ions but only in the draw side 132 of the hydrophobic membrane housing 126. Accordingly, the ammonium bicarbonate ions are reformed within the draw side 132 of the hydrophobic membrane housing 126.

At step 522, the freshwater 140 that does not include ammonium bicarbonate ions or gases is directed out of the outlet of the feed side 128 of the hydrophobic membrane housing 126 and into an inlet 214 of the source side 120 of the water source heat pump 116. The freshwater 140 loses further heat and becomes cooler as the freshwater 140 passes through the source side 120 of the water heat pump 116.

As also shown in FIG. 2, in a non-limiting embodiment, the freshwater 140 is directed to a tank, such as vacuum tank 134b and pumped one or more times in and out of the vacuum tank 134b before pumping a volume or an amount of the freshwater 140 out of the water desalination system 100 for further treatment and/or end use as shown at step 524 in FIG. 5.

At step 526, it is noted that after step 522, a portion of the freshwater 140 may be diverted (e.g., using dividing valve 122b as shown in FIG. 2), back to the draw side 132 of the hydrophobic membrane housing 126 to help form additional concentrated ammonium bicarbonate solution 107. This is because the cooler freshwater 140 flowing into the draw side 132 of the hydrophobic membrane housing 126 while a vacuum 146 is maintained is able to serve as an appropriate solution for the ammonium bicarbonate ions to condense and reform a concentrated ammonium bicarbonate solution 107 as the solution 107 leaves the draw side 132 of the hydrophobic membrane housing 126.

At step 528, the concentrated ammonium bicarbonate solution 107 can be directed to the inlet 204 of the draw side 110 of the FO membrane housing 104 in order to serve as new draw solution for a new batch or new volume of salt water 102 and/or contaminated water 103 that is directed into the feed side 106 of the FO membrane housing 104. In this way, the ammonium bicarbonate ions are not wasted and are recycled and repurposed using the water desalination system 100 of FIGS. 1-5 and as described above in one or more non-limiting embodiment.

As stated at step 530, the actions described in steps 502-526 may continue over and over again as needed to continuously desalinate batches or amounts of saltwater 102 and/or contaminated water 103 until the system 100 needs to be shut down for maintenance or the process is complete for a certain amount of freshwater product water 140 to be produced.

Figure 6:
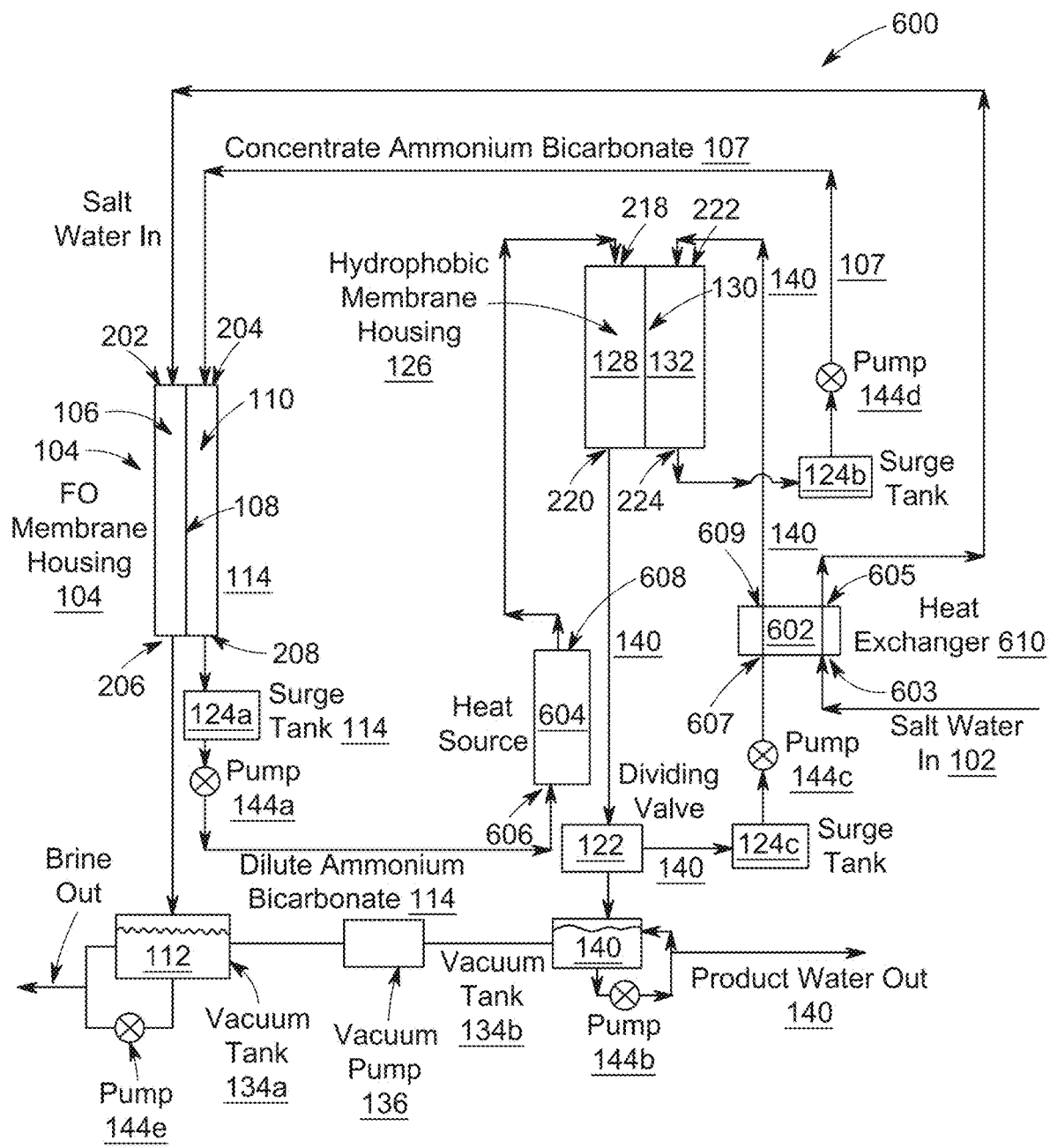
FIG. 6 shows a pictorial illustration flowchart with another embodiment of a water desalination system that utilizes heat from a heat source site instead of from the water heat pump as used in FIG. 2.

The exemplary water desalination method and system 100 as shown in FIG. 2 is dependent on having a water heat pump 116. FIG. 6 illustrates another exemplary method for water desalination using forward osmosis and a concentrated ammonium bicarbonate solution 107 as a draw solution that uses the heat extracted from a heat source 604 rather than a water heat pump 116 and as such may be sited in anywhere as long as there is a heat source 604.

In a non-limiting embodiment, the system 600 in FIG. 6, may begin with incoming salt water 102 being directed into an inlet 603 of a heat exchanger 610. The heat exchanger 610 may be any type of heat exchanger 610 as known in the art that can transfer heat between the incoming and outgoing fluids to regulate temperature. The incoming salt water 102 exits at outlet 605 of heat exchanger 602, as shown in FIG. 6, and is directed into the inlet 202 of the feed side 106 of the FO membrane housing 104. Generally, simultaneously, an initial amount of concentrated ammonium bicarbonate 107 solution is directed into an inlet 204 of the draw side 110 of the FO membrane housing 104. The system 600 shown in FIG. 6 operates in the same manner as the system 100 shown in FIG. 2 in which the ammonium bicarbonate in the concentrated ammonium bicarbonate solution 107 flowing through the draw side 110 of the FO membrane housing 104 has a higher osmotic pressure and is able to draw a high percentage of the water from the saltwater solution 102 flowing through the feed side 106 of the FO membrane housing 104 through the FO membrane 108 and into the draw side 110 of the FO membrane housing 104. The brine solution 112 is directed into the surge tank 134a and pumped at a higher flow rate and pressure to pump out the brine solution 112 gradually for the same reasons shown above. The system 600 shown in FIG. 6 is also kept and maintained at a vacuum 146. A vacuum pump 136 may be turned on initially to help create the vacuum 146 and may be turned off and on as needed to adjust the maintenance of the vacuum 146.

Next, the resulting permeate water/diluted ammonium bicarbonate solution 114 is directed out of the outlet 208 of the draw side 110 of the FO membrane housing 104 and to the first surge tank 124a. Next, the resulting permeate water 114 is pumped via pump 144a, for example, to one or more incoming pipes or other inlets 606 connected to the heat source 604. In a non-limiting embodiment, the heat source 604 may be, but is not limited to, primary heat sources such as (without limitation) geothermal, solar, fossil fuels, and biomass sources of primary heat. Other sources of primary heat may alternatively be used. Further, waste heat may be used, whereby waste heat comes from nuclear, fossil fuel plants, geothermal, biomass, and solar heat sources. Other waste heat sources may include, but are not limited to, data processing centers, cement plants, or steel plants and other sources of waste heat. Various types of power plants, such as but not limited to, natural gas power plants, nuclear power plants, or fossil fuel plants may also be sources of both primary and waste heat. Additionally, solar panels can be used to generate heat that can be used as the heat source 604. Essentially, the system 600 uses free or readily available heat that is dissipated or generated by the heat source 604 to heat the resulting permeate solution 114 that is directed from the outlet/exit point 608 for the heat source 604 and then directed into the inlet 218 of the feed side 128 of the hydrophobic membrane housing 126.

An additional advantage of having an energy based plant such as a power plant, nuclear plant, or fossil fuel plant act as the heat source 604 is that such energy based plants are frequently located next to salt water and as such it would be easier to have the salt water solution 102 directed into the water desalination system 600 in order to desalinate the salt water 102 and obtain a good percentage or amount of product water 140.

Accordingly, the heat source 604 is meant to provide an amount of waste heat that can be oriented towards and redirected to heat the incoming resulting permeate solution 114 before the incoming permeate solution is directed to the feed side 128 of the hydrophobic membrane housing 126. The heat obtained from the heat source 604 is essentially waste heat or readily available heat that can be repurposed in this manner.

Once the diluted ammonium bicarbonate solution/resulting permeate water solution 114 is heated, it can be directed into the inlet 218 of a hydrophobic membrane housing 126. The feed side 128 has the hotter solution 114 than the draw side 132 of the hydrophobic membrane housing 126. Due to the temperature differences and the presence of the vacuum 146, the ammonium bicarbonate in the solution 114 in the feed side 128 is caused to disassociate into gases (e.g., ammonia, carbon dioxide, water vapor) whereby the gases pass through the hydrophobic membrane 130 of the hydrophobic membrane housing 126 into the draw side 132 of the hydrophobic membrane housing 126. The gases subsequently reassociate and condense into ammonium bicarbonate ions and this solution becomes concentrated bicarbonate solution 107 that flows out of the outlet 224 of the draw side 132 of the hydrophobic membrane housing 126 and is caused to flow towards the surge tank 124b, as shown in FIG. 6. In a non-limiting embodiment, the surge tank 124b may hold or store the concentrated ammonium bicarbonate solution 107 and then redirect the concentrated ammonium bicarbonate solution 107 via pump 144d to the inlet 204 of the draw side 110 of the FO membrane housing 104 for processing and desalinating a new amount of incoming salt water 102.

The fresh water 140 that flows out of the outlet 220 of the feed side 128 of the hydrophobic membrane housing 126 may be directed to a dividing valve 122, as shown in FIG. 6 and then a portion of the fresh water 140 is directed into the vacuum tank 134b in order to be pumped in and out multiple times (e.g., via pump 144b) at a higher flow and pressure while still under a vacuum 146 prior to a percentage or amount of product water 140 being directed out of the system 600.

The portion of fresh water 140 that was not directed into the vacuum tank 134b may be directed to the surge tank 124c and pumped into the inlet 607 of the heat exchanger 602 and out of the outlet 609 of the heat exchanger 602 in order to be directed into the inlet 222 of the draw side 132 of the hydrophobic membrane housing 126. This portion of product water 140 may be used to generate the condensation of the ammonia, carbon dioxide, and water vapor gases into the concentrated ammonium bicarbonate solution 107 that flows out of the outlet 224 of the draw side 132 of the hydrophobic membrane housing 126.

It is noted that the system 600 shown in FIG. 6 has many overlapping similarities with the system 100 shown in FIG. 2. For example, the incoming salt water 102 may also be at ambient temperature.

The system 600 shown in FIG. 6, accordingly, can further help with the benefit to the environment because salt water 102 is desalinated to product freshwater/product water 140 in a manner that is less energy intensive and expensive as compared to a reverse osmosis process. Additionally, the system 600 shown in FIG. 6 can take advantage of a heat source 604, such as an existing geothermal well, energy plant, solar cells, or any other source of heat and use that heat to heat up the diluted ammonium bicarbonate solution 114 rather than the water heat pump 116 shown in FIG. 1 and in FIG. 2. This may be an additional way to recycle and reuse and make use of such existing heat sources 604. One of the advantages of the system 600 shown in FIG. 6 may be that a higher temperature utilized for resulting permeate solution/diluted ammonium bicarbonate solution 114 may cause a greater amount of solubility of the ammonium bicarbonate. It is known that higher temperatures causes greater solubility of the ammonium bicarbonate in the heated solution. As such, it may be possible to have a higher percentage yield of product water 140 using the system 600 shown in FIG. 6 as compared to the system 100 shown in FIG. 2. For example, it may be possible to obtain a 70%-75% output of product water 140 as compared to 60% using the method and system 100 shown in FIG. 2. Notably, both systems 100 and 600 still offer a great deal of potential advantage and offer unique solutions to the problem of the scarcity of useable, freshwater that does not include saline or other contaminants and obtaining the freshwater in a cost-efficient, energy efficient manner.

Advantageously, the water desalination system 100 shown in FIG. 1 and in FIG. 2 and in FIG. 6 recycles and reuses many essential components, which helps to make the water desalination system 100 shown therein more efficient and cost-effective. As much as possible, a portion of the product water 140 is utilized to assist in the generation of concentrated ammonium bicarbonate solution 107 and the diluted ammonium bicarbonate solution 114. Further, the ammonium bicarbonate ions are allowed to vaporize into gases and then reform or reassociate as ammonium bicarbonate ions in the hydrophobic membrane housing 126 and then are directed to the surge tank 124b as part of the concentrated ammonium bicarbonate solution 107 that can be re-directed to the draw side 110 of the FO membrane housing 104 and used to continuously process and desalinate new amounts of incoming salt water 102/contaminated water 103. Accordingly, the systems 100 shown in FIGS. 1-6 attempt to recycle and reuse components as much as possible in an efficient manner.

It is noted that the system 100 would be implemented in a layout that is designed to facilitate the method of desalination as shown in FIG. 2. As such, the FO membrane housing 104, the exemplary surge tanks 124a-124c, the exemplary pumps 144a-144e, the dividing valves 122a-122b, the hydrophobic membrane housing 126, and the incoming solutions, including the salt water solution 102 or contaminated water solution 103, and concentrated ammonium bicarbonate solution 107, and any outgoing product water 140 would be structurally contained in a water desalination plant or site that implements the method and system 100 shown in FIG. 2 and also shown in FIG. 5. The water desalination plant that implements the method and system 100 shown in FIG. 2 and in FIG. 5 may be located near a body of salt water to have readily available quantities of salt water solution 102 to desalinate or near other sources of contaminated water 103 to desalinate.

Similarly, the method and system 600 shown in FIG. 6 will also likely be implemented at a water desalination plant or site that facilitates the incorporation of the devices shown in FIG. 6 and also one which takes into account any engineering needed or a layout needed to facilitate the incorporation of the heat derived from or taken from the heat source 604 shown in FIG. 4.

Many other benefits and advantages are offered by the water desalination system 100 and 600 as shown in the Figures and described herein in one or more non-limiting embodiments.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted. The term "coupled to" as used herein may refer to a direct or indirect connection. The term "set" may refer to one or more of an item.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A water desalination method that uses forward osmosis, comprising:

(a) creating a vacuum in a water desalination system;

(b) after creating the vacuum in the water desalination system, flowing salt water or contaminated water to be desalinated through a feed side of a forward osmosis (FO) membrane housing, wherein the salt water or the contaminated water to be desalinated is at ambient temperature;

(c) after step (b), while flowing the salt water or the contaminated water through an inlet of the feed side of the FO membrane housing, flowing a concentrated ammonium bicarbonate solution through an inlet of a draw side of the FO membrane housing, wherein the feed side and the draw side of the FO membrane housing are separated by a FO permeable membrane, wherein the concentrated ammonium bicarbonate solution functions as a draw solution in the FO membrane housing, wherein a temperature of the concentrated ammonium bicarbonate solution is also at ambient temperature;

(d) as a result of osmotic pressure, allowing a minimum period of time for the concentrated ammonium bicarbonate to pull a percentage of desalinated product water from the feed side through the FO permeable membrane to the draw side of the FO membrane housing;

(e) flowing brine or other extracted contaminant solutes pulled through the FO membrane housing in the feed side of the FO membrane housing to a collection point for the brine or the other extracted contaminant solutes, further comprising flowing the brine or the other extracted contaminant solutes to a first vacuum tank and pumping the brine or the other extracted contaminant solutes one or more time in and out of the first vacuum tank before redirecting the brine or the other extracted solutes to another location for further processing or collection;

(f) flowing a resulting solution through the draw side of the FO membrane housing from the draw side of the FO membrane housing, wherein the resulting solution is a combination of the percentage of the desalinated product water and the concentrated ammonium bicarbonate solution and wherein the resulting solution is a diluted ammonium bicarbonate solution;

(g) pumping the resulting solution to a water heat pump, wherein the water heat pump has a load side and a source side, wherein the load side is divided from the source side of the water heat pump;

(h) flowing the resulting solution through the load side of the water heat pump, further comprising, using the water heat pump to heat or raise a temperature of the resulting solution as the resulting solution is flowing through the load side of the water heat pump;

(i) after step (h), flowing the heated resulting solution to a feed side of a hydrophobic membrane housing, wherein the hydrophobic membrane housing comprises a hydrophobic membrane that permits gases to flow through the hydrophobic membrane from the feed side of the hydrophobic membrane housing to a draw side of the hydrophobic membrane housing, wherein the gases are ammonia, carbon dioxide, and water vapor;

(j) allowing the heated resulting solution to be filtered through the hydrophobic membrane of the hydrophobic membrane housing, wherein any ammonium bicarbonate ions in the heated resulting solution are converted or dissociate into the gases in the feed side of the hydrophobic membrane housing, wherein the gases pass through the hydrophobic membrane from the feed side of the hydrophobic membrane housing to the draw side of the hydrophobic membrane housing, leaving behind freshwater product water to flow out of the feed side of the hydrophobic membrane housing without ammonium bicarbonate ions present in the freshwater product water;

(k) flowing the freshwater product water from the feed side of the hydrophobic membrane through a first dividing valve;

(l) after passing through the first dividing valve, directing a first amount of the freshwater product into an inlet of the source side of the water heat pump and re-directing a second amount of the freshwater product water directly to a second vacuum tank;

(m) directing the freshwater product from the water heat pump to a second dividing valve further comprising dividing up the first amount of freshwater product that has been cooled into a first amount of cooled freshwater and a second amount of cooled freshwater;

(n) directing the first amount of the freshwater product to the second vacuum tank; and (o) directing the second amount of cooled freshwater to the draw side of the hydrophobic membrane so that the cooled freshwater interacts with the gases of the converted ammonium bicarbonate ions and the gases reform or reassociate as ammonium bicarbonate ions that exit the draw side of the hydrophobic membrane and flow out of the draw side of the hydrophobic membrane as a concentrated ammonium bicarbonate solution.

2. The water desalination method of claim 1, further comprising:

(p) directing cooler water through the draw side of the hydrophobic membrane housing;

(q) once the gases pass through the hydrophobic membrane of the hydrophobic membrane housing to the draw side, allowing the gases to condense into ammonium bicarbonate ions in the cooler water in the draw side of the hydrophobic membrane housing to form an ammonium bicarbonate solution, wherein the condensing occurs due to a temperature difference between the heated resulting solution flowing through the feed side of the hydrophobic membrane housing and the cooler water flowing through the draw side of the hydrophobic membrane housing;

(r) flowing the ammonium bicarbonate solution from the draw side of the hydrophobic membrane housing back into the inlet of the draw side of the FO membrane housing in order to desalinate a new amount of the salt water or contaminant water flowing into the inlet of the feed side of the FO membrane housing and to supply a new draw solution for the FO membrane housing.

3. The water desalination system of claim 1, further comprising pumping the concentrated ammonium bicarbonate solution from step (o) and redirecting the concentrated ammonium bicarbonate solution to the draw side of the FO membrane housing to be used as a new draw solution thereby reusing the new draw solution to assist in the desalination of any additional salt water or contaminant water directed through the feed side of the FO membrane housing.

4. The water desalination method of claim 1, wherein prior to step (o), flowing the concentrated ammonium bicarbonate solution to a surge tank.

5. The water desalination method of claim 1, further comprising, after flowing the resulting solution from the draw side of the FO membrane housing at step (f), flowing the resulting solution through a surge tank.

6. The water desalination method of claim 1, further comprising:

after step (o), flowing and recirculating the first amount of the freshwater product water from the second vacuum tank to a pump one or more times before redirecting the first amount of the freshwater product water for the end use in order to pump the first amount of the freshwater product water out while maintaining the vacuum.

7. The water desalination method of claim 1, wherein the FO membrane of the FO membrane housing comprises a hydrophilic membrane capable of passing water through the membrane.

8. The water desalination method of claim 1, wherein the hydrophobic membrane of the hydrophobic membrane housing permits a transfer of the gases through the hydrophobic membrane and retains water on the feed side of the hydrophobic membrane.

9. The water desalination method of claim 1, further comprising, maintaining a continuous vacuum.

10. The water desalination method of claim 9, wherein the maintaining of the continuous vacuum further enables the gases to disassociate at a lower temperature than what is required if the vacuum is not maintained.

11. The water desalination method of claim 1, wherein the concentrated ammonium bicarbonate solution comprises approximately at least 25% of ammonium bicarbonate.

12. The water desalination method of claim 1, wherein the concentrated ammonium bicarbonate solution comprises between 20 to 35 percent of ammonium bicarbonate.

13. The water desalination method of claim 1, wherein the water desalination system is implemented in a water desalination plant.

* * * * *